(12) United States Patent
Pisane et al.

(10) Patent No.: US 12,405,087 B2
(45) Date of Patent: Sep. 2, 2025

(54) SECURE REMOTE OPERATION OF A WEAPONS SYSTEM

(71) Applicant: JOHN COCKERILL DEFENSE SA, Ans (BE)

(72) Inventors: Jonathan Pisane, Fernelmont (BE); Yohann Aubry, Awans (BE)

(73) Assignee: John Cockerill Defense SA, Ans (BE)

( * ) Notice: Subject to any disclaimer, the term of this patent is extended or adjusted under 35 U.S.C. 154(b) by 0 days.

(21) Appl. No.: 18/840,531

(22) PCT Filed: Feb. 17, 2023

(86) PCT No.: PCT/EP2023/054067
§ 371 (c)(1),
(2) Date: Aug. 22, 2024

(87) PCT Pub. No.: WO2023/161153
PCT Pub. Date: Aug. 31, 2023

(65) Prior Publication Data
US 2025/0180331 A1    Jun. 5, 2025

(30) Foreign Application Priority Data

Feb. 25, 2022  (EP) .................................. 22158756

(51) Int. Cl.
*F41G 5/06*  (2006.01)
*F41G 5/24*  (2006.01)
*H04L 12/40* (2006.01)

(52) U.S. Cl.
CPC ................ *F41G 5/06* (2013.01); *F41G 5/24* (2013.01); *H04L 12/40* (2013.01); *H04L 2012/40215* (2013.01); *H04L 2012/40273* (2013.01)

(58) Field of Classification Search
CPC ... F41G 5/06; F41G 5/24; H04L 12/40; H04L 2012/40215; H04L 2012/40273
(Continued)

(56) References Cited

U.S. PATENT DOCUMENTS

2012/0281829 A1* 11/2012 Rudakevych ........... F42C 15/42
                                                              380/255
2020/0117900 A1*  4/2020 Deng ..................... H04L 67/52

FOREIGN PATENT DOCUMENTS

EP        0419897 A2    4/1991
EP        1947413 B2    3/2017
(Continued)

*Primary Examiner* — John Cooper
(74) *Attorney, Agent, or Firm* — Leydig, Voit & Mayer, Ltd.

(57) ABSTRACT

A system for securing two-way communications using a radio frequency wireless network between N weapons systems to be remotely operated, with N≥1, and a control station, includes: a remote-control station accommodating at least one operator, with a first field data bus to which a first controller is connected with at least a first transceiver system as a client; and N conventional weapons systems, each with a second field data bus and at least one client, the system including an additional client provided with a second transceiver system to be connected to each of the N weapons systems, permanently or removably, for operation in remote operation mode, the first controller with the first transceiver thereof receiving data from and/or sending commands to the client via the radio frequency wireless network.

13 Claims, 4 Drawing Sheets

(58) Field of Classification Search
USPC .............................................. 89/27.11, 28.05
See application file for complete search history.

(56) References Cited

FOREIGN PATENT DOCUMENTS

| | | |
|---|---|---|
| FR | 2879730 A1 | 6/2006 |
| GB | 2530612 A | 3/2016 |
| WO | WO 0165197 A1 | 9/2001 |
| WO | WO 2013127397 A1 | 9/2013 |

* cited by examiner

SECURE REMOTE OPERATION OF A WEAPONS SYSTEM

CROSS-REFERENCE TO PRIOR APPLICATIONS

This application is a U.S. National Phase application under 35 U.S.C. § 371 of International Application No. PCT/EP2023/054067, filed on Feb. 17, 2023, and claims benefit to European Patent Application No. EP 22158756.1, filed on Feb. 25, 2022. The International Application was published in French on Aug. 31, 2023 as WO/2023/161153 under PCT Article 21(2).

FIELD

The present invention arises from the technological field of secure telecommunications used for controlling the functions of one or a plurality of weapons systems, such as e.g. unmanned tank turrets, the electronic architecture of which includes a data bus, e.g. a CAN bus, Ethernet or other.

BACKGROUND

Today the controls of a conventional tank turret, hence manned, are generally introduced by two operators, the commander and the gunner. However, the market is increasingly demanding a supply of unmanned turrets, as the endangering of operators during missions becomes less and less acceptable for the society.

The present invention is positioned within the framework of the addition of a wireless communications system for the transmission of videos and turret commands and measurements.

When switching from wired links to links in the radio field, many constraints are added to take into account the security of the links, such as e.g. the use of a bandwidth, latency time, frequencies available for communication, etc. for obtaining the desired quality of service. Quality of service (QoS) refers to any technology capable of managing data transmission while reducing packet loss, latency, and jitter on the network. The purpose of such concept is to control and manage network resources by prioritizing certain types of network data.

Moreover, the context involves the remote operation of weapons systems in complex and noisy environments, requiring the use of ad hoc bandwidths and frequencies depending the reality of the field, in order to guarantee the quality of service, i.e. by taking into account in particular the latency time, in the most secure way possible, via an appropriate connection mechanism between a control station and one or a plurality of weapons systems.

At present, the aforementioned need is used in particular in the field of drones essentially for leisure purposes, but the technique used is generally limited to modeling control without using a complex electronic system such as an electronic system involving a multiplexed bus, called field bus (as opposed to a bus for office computer communication) such as e.g. a CAN or a MilCAN bus, an Ethernet-based system or other. As a reminder, a field bus establishes the connection between the sensors, the actuators and the control computer (or PLC, programmable logic controller). A plurality of devices can be connected to a field bus and can send the messages thereof via the same line (linear topology).

Solutions are also found in the field of autonomous vehicles which, depending on the control systems and/or algorithms used, are apt to autonomously generate one or a plurality of specific control instructions (such as robots).

In the field of armored vehicle turrets, many demonstration turrets can be found, but the turrets are generally remotely operated by cable, not by radio.

Little information on said subject matter circulates publicly and the unmanned turrets currently available on the market are thus, in the vast majority, still operated by wire links. More particularly, there is no validation of the commands.

Document EP 0 419 897 A2 e.g. discloses a remote control system for a combat vehicle comprising a remote control apparatus for supplying signals to the vehicle in order to control a plurality of vehicle functions controlled in a conventional manner by the personnel on board the vehicle; a vehicle-mounted apparatus which can be operated selectively so as to receive the signals coming from the remote control apparatus and to operate the plurality of vehicle functions according to the signals; and an apparatus for selectively disabling the vehicle-mounted apparatus so as to make a non-remote control of the vehicle functions possible.

In U.S. Pat. No. 2012/281829 A1, the invention relates to a remote digital firing system for selectively firing a plurality of remote mission payloads. The digital remote firing system comprises a first set of firing circuits coupled in communication and operating for firing a corresponding first set of remote mission payloads and a second set of firing circuits coupled in communication and operating for firing a second corresponding set of firing circuits of remote mission payloads. The remote digital firing system comprises a firing control panel coupled in communication with the firing circuits of the first and second sets, a first digital code plug configured for being integrated into a communication combination with each firing circuit of the first set and the firing control panel, a second digital code plug configured for being integrated into a communication combination with each firing circuit of the second set and the fire control panel, and a payload selection switch for selecting a remote mission payload.

Document EP 1 947 413 B2 discloses a method for remote control of a combat vehicle weapons system with a weapons system computer, which acts on aiming devices of the weapon system, wherein a weapons system display unit for displaying screen contents and a weapons system input unit are connected, which are arranged inside the combat vehicle for controlling the weapons system in a non-remote-controlled mode, by means of which a data link is established between a remote control computer, to which a remote control display unit and a remote control input unit are connected, and the weapons system computer, characterized in that, in a remote control mode for remotely controlling the weapons system computer by the remote control computer, the screen contents displayed in the non-remote control mode on the weapons system display unit are represented at least partially on the remote control display unit and in that input actions, which are executed by the remote control input unit, act as input actions of the input unit of the weapons system and in such a way that the weapons system can be switched by the remote control computer into a secure state, wherein a movement of the weapons system is prevented.

Document WO 01/65197 A1 discloses a modular device essentially comprising a mobile control post, ground bases and remotely operated weapons. The ground bases are distributed over an area to be protected and are responsible for detecting locating and monitoring intrusions in said area.

The remotely operated weapons are placed within firing range of this area and operate either automatically from data collected by the land bases or by human intervention form the control post.

The problem to be solved is to give an existing and operational turret the possibility of being operated interchangeably either by onboard personnel or, in particular or dangerous situations, by remote operation.

The main challenge is to reduce the exposure of soldiers in operation theaters by allowing the soldiers to remotely control armored turrets in a fluid, secure and reliable manner.

SUMMARY

In an embodiment, the present invention provides a system for securing two-way communications using a radio frequency wireless network between N weapons systems to be remotely operated, with N≥1, and a control station, the system comprising: a remote-control station accommodating at least one operator, with a first field data bus to which a first controller is connected with at least a first transceiver system as a client; and N conventional weapons systems, each with a second field data bus and at least one client, the system comprising an additional client provided with a second transceiver system configured to be connected to each of the N weapons systems, permanently or removably, for operation in remote operation mode, the first controller with the first transceiver thereof being configured to receive data from and/or send commands to the client via the radio frequency wireless network and the additional client with the second transceiver being configured to send data from and/or receive commands for the client via the radio frequency wireless network, wherein the first transceiver and the second transceiver comprise software programs defining an operation in software radio or SDR mode and are configured to exchange messages so as to provide a requested quality of service comprising a predetermined latency time, and wherein the system is configured to enter a degraded SDR mode if the predetermined latency time is exceeded, and to allow both field data buses and respective clients thereof to be operated smoothly despite radio link interference as follows: a transmitter configured to send a message to a receiver receives a first acknowledgment from the receiver, which allows the message sent to the transmitter to be erased, based on the first acknowledgment not being received, the message is returned a certain number of times within a time limit set by the predetermined latency time, after the time limit, the sender enters the degraded SDR dmode and/or continues to try to pass the message and/or sends a second acknowledgment to the working bus of which the sender is a client so that other clients of the working bus are operable without disruption and in a transparent manner.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention is able to transform the weapons systems of an existing fleet, and currently operated in a conventional mode of operation, manned and not remotely operated, into a remotely operated mode of operation, such as e.g. the transformation of a turret with onboard personnel (commander and gunner) in an unmanned turret which is remotely operated from a remote control station.

In particular, the invention aims to implement, via a non-wired communication, e.g. a radio communication, a secure and fluid communication between two or a plurality of entities which are not physically connected.

In particular still, the invention aims to propose a secure and efficient management from the point of view of the concept of quality of service of communications in a hybrid system consisting of two field data buses connected by a radio link, bus and radio communications having very different constraints.

Another goal of the invention is to allow the personnel of the remote control station to have access to the devices, controls, sensors and commands of a weapons system such as a turret exactly as if the personnel were inside the turret. However, as soon as the turret no longer needs to be controlled and operated remotely, the additional transceiver client has to be able to be disconnected from the interface and the turret can return to the initial state thereof for being operated by onboard personnel (typically, commander and gunner).

A first aspect of the present invention relates to a system for securing two-way communications using a radio frequency wireless network, between N weapons systems apt to be remotely operated, with N≥1, and a control station, comprising:
a remote-control station for accommodating at least one operator, with a first field data bus to which a first controller is connected with at least a first transceiver system as a client;
N conventional weapons systems each with a second field data bus, and at least one client,
said system comprising an additional client with a second transceiver system, apt to be connected to each of the N weapons systems, permanently or removably, for operation in remote operation mode; the first controller with the first transceiver thereof being then apt to receive data from and/or send commands to the client via the radio network and the additional client with the second transceiver being apt to send data from and/or receive commands intended for the client via the radio network The first transceiver and the second transceiver being implemented in software programs, defining an operation in software radio or SDR and are configured for exchanging messages so as to provide the requested quality of service and in particular a predetermined latency time; characterized in that said system is configured for entering degraded SDR mode if the predetermined latency time is exceeded and allow both field data buses and the respective clients thereof to be operated smoothly despite radio link interference in the following manner:

a transmitter which sends a message to a receiver receives a first acknowledgment from the receiver, which allows the message sent to the transmitter to be erased;

if the first acknowledgment is not received, the message is returned a certain number of times within a time limit set by the predetermined latency time;

after said time limit, the sender enters degraded mode and/or continues to try to pass the message and/or sends a second acknowledgment to the working bus of which same is a client so that the other clients of the working bus can operate without disruption and in a transparent manner;

According to preferred embodiments, the system for securing two-way communications further comprises at least one of the following features or an appropriate combination of a plurality thereof:

The N weapons systems are armored vehicle turrets and the clients are sensors or actuators;

The additional client is a second controller or computer equipped with the second transceiver system for removably connecting to at least one of the N weapons systems in a conventional configuration;

The first field bus, respectively the second field bus, is an industrial field bus such as CAN, MilCAN or Ethernet;

field buses can be replaced by communication systems operating according to other architectures, such as e.g. a star [network] architecture;

the accessibility for the operator to the respective devices, controllers, sensors and actuator commands of the weapons system is transparent and identical to a conventional configuration where the weapons system is manned;

the system is configured for accepting commands sent with very low latency;

the system is apt to manage multiple communications with weapons systems;

the system comprises means for searching for unmanned frequencies so as to avoid jamming and enemy radio links.

A second aspect of the present invention relates to the use of a weapons system such as an armored vehicle turret, successively according to one of the following two modes and vice versa:

an unmanned remote operation mode using the security system for two-way radio communications between the control station and the remotely operated weapon system, as described hereinabove;

an ordinary or conventional mode of operation, in manned form, where the second controller or computer equipped with a second transceiver system has been disconnected from the weapon system.

Figure 1:
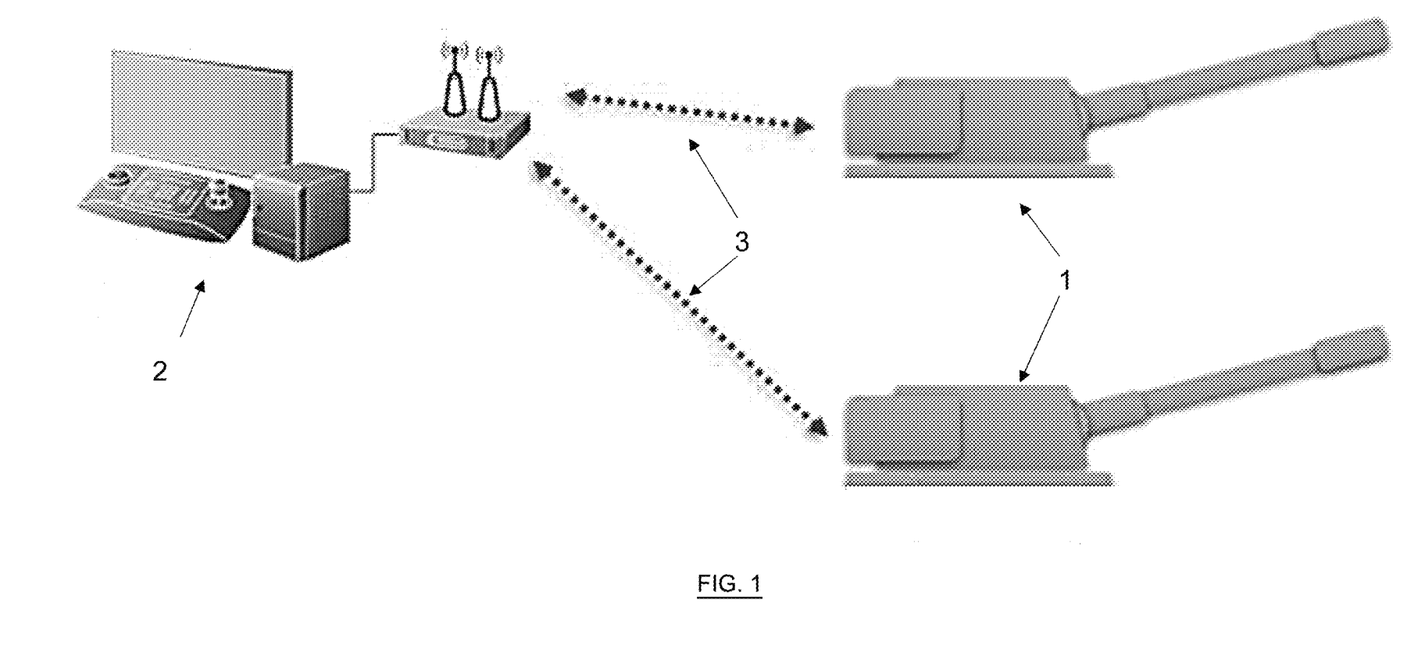
FIG. 1 shows schematically, a system for secure wireless communications between a control station and one or a plurality of remote-operated turrets according to the present invention.

According to the system of the present invention shown in FIG. 1, a weapons system 1, such as an armored vehicle turret, or a plurality of generally N unmanned weapons systems, is (are) remotely operated from a (same) control station 2 simultaneously and dynamically (i.e. weapons systems can be added and removed in real-time). The communications between the control station 2 and the weapon system(s) 1 are wireless communications, preferentially radiofrequency communications 3.

For the purposes of the invention, a software defined radio system (SDR) will preferentially be used. It is known that the above is a configurable radiocommunication system using digital signal processing techniques on programmable digital circuits. The flexibility of such a system allows same to adapt to different radiocommunication protocols, and to meet the growing needs for performance and interoperability between systems.

From the control post 2, the operator can select the turret 1 they want to operate, the radio system being in charge of defining the radio parameters (frequency, bandwidth, etc.) according to the defined QoS. Preferentially, the operator receives in real-time, a video signal coming from cameras onboard the different selected turrets. The operator also controls all the functions of the turret that the operator chooses to operate.

The radio system normally allows video and control data to be transported in full duplex, either in both directions of communication on the radio and the electronic system, via a field bus such as a CAN (Controller Area Network) bus, Ethernet or according to another architecture known to the person skilled in the art.

Figure 2:
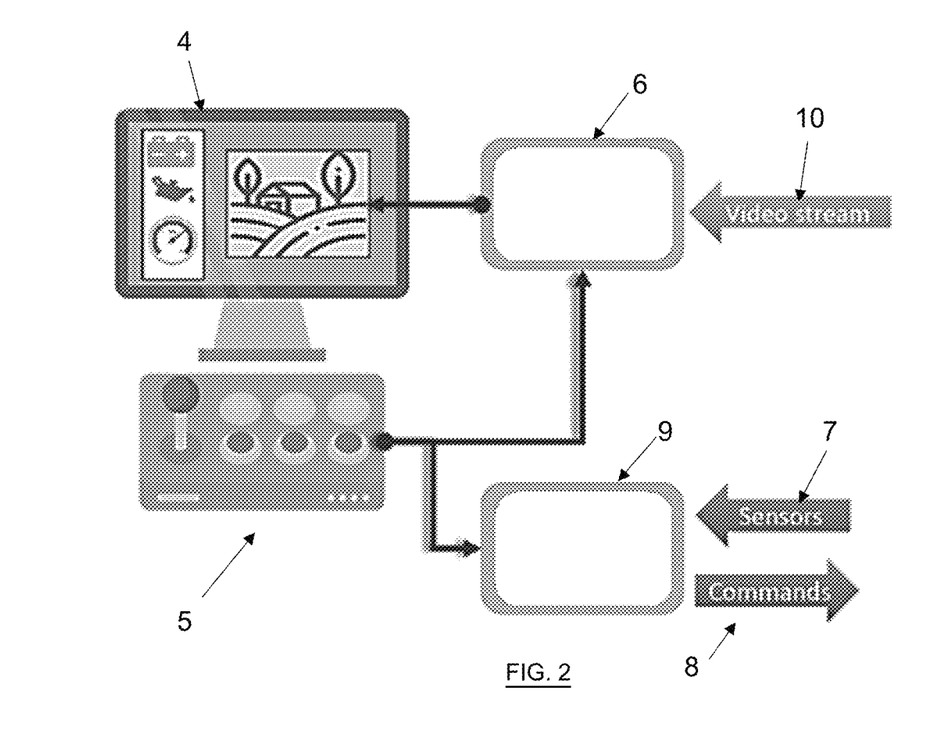
FIG. 2 represents schematically, the separation of the channels dedicated to the video stream and to the transit of commands, respectively, and of the data in the system according to the invention.

Advantageously, the video and the data are transmitted on N different channels, N>1 (see FIG. 2). The number of channels can be configured through software. Free frequency search algorithms will be used to avoid jamming and other enemy radio links in order to have optimal operation. The control station has at least one acquisition interface 4 (display) and one control interface (5) (keyboard, lever, button, joystick, etc.), on which the operator can make the selection 6 of a video stream 10 coming from one of the turrets 1. Via the control interface 5, the operator can also control a controller 9 which sends a command 8 to a turret 1, depending on the data received from the sensor or sensors 7.

The data transmission channel, which is essential in operation, should have as few errors and as little latency as possible, in full duplex mode. Preferentially, the resources already present and internal to the weapons system will be used for transmission, e.g. the CAN bus, MilCAN or other (see FIG. 3).

On the electronic field bus, e.g. the CAN bus, Ethernet or other, all transmissions of commands from the transmitter reception or confirmation messages from the receivers, transit and are received. The receivers can be actuators or other elements which can be controlled electrically, by human action or by automation.

Figure 3:
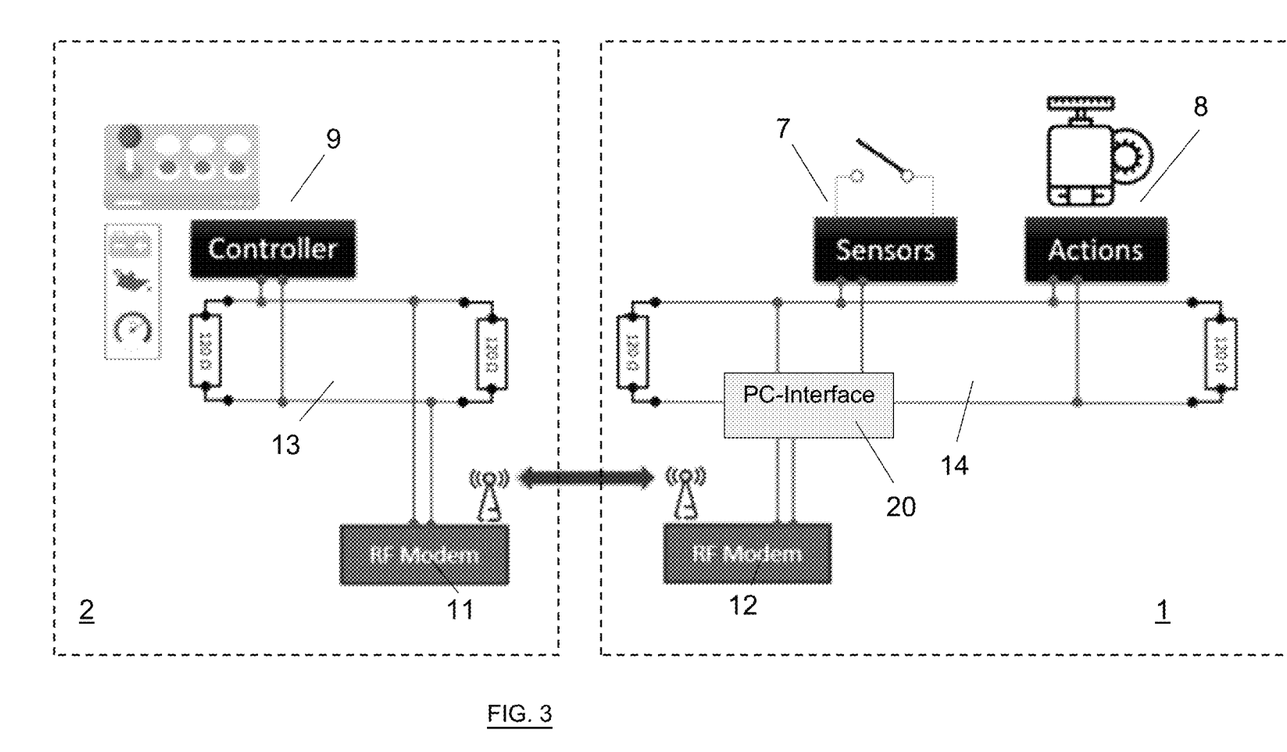
FIG. 3 shows schematically, the means of control of communications using a working bus and a radio transmission, according to the invention.

FIG. 3 shows a schematic view of the control with the data bus and the radio, according to the invention. The electronic circuit of the control station 2 includes a first bus 13 (as described hereinabove, e.g. a CAN bus) to which the controller 9 and a first transceiver (RF modem) 11 are connected in a manner known to a person skilled in the art. The electronic circuit of the remotely operated turret 1 includes a second bus 14 (as described hereinabove, e.g. a CAN bus) to which are connected, in a manner known to a person skilled in the art, "clients" such as e.g. a sensor 7 or an actuator 8 as well as an additional client on the bus of the weapons system which is a second transceiver (RF modem) 12 used for remotely connecting the control station 2 to the weapons system 1 in remote operation mode. In practice, the CAN bus is split but can be virtually seen in the system as one bus. On such a bus, if a transmitter (client 1) sends e.g. a frame with an command (or data) to a receiver (client 2), as soon as the receiver receives the command, the latter will send back to the transmitter a frame with a message of validation and good reception of the command (called acknowledgment, such notion being well known to a person skilled in the art of communication systems).

All the information data transit through the CAN bus, whether as control information data (two-way) or information data such as a video stream (one-way).

A difficulty in controlling communications arises when e.g. there is a loss and/or excessive latency of the radio signal between transmitters and receivers. Thus, on the control station side, e.g., if the controller (client 1) sends a control signal to the electronic system which is not actually received, the controller does not receive the acknowledgment of reception (or acknowledgment) from the receiver (client 2).

According to the invention, the addition of the "RF modem" client on the CAN bus of the weapons system should not modify in (almost) any way the behavior of the CAN bus. The RF modem thus behaves like a conventional client on such a bus and will thus collect the messages to be sent to the control station. The reasoning also applies in the other direction (from the control station to the weapon system). A conventional and normal operation of the physical CAN bus of the weapons system is thus possible. The RF modem will then send the data to the control station in the most efficient manner possible (minimum use of resources so as to provide the QoS) and request an acknowledgment from the RF modem of the control station. Upon receipt of the acknowledgment by the RF modem of the weapon system, the message is deleted from the memory of the RF modem. If such acknowledgment is not received, the RF modem of the weapons system will send the message back to the control station a certain number of times. Once such time determined so as to guarantee the latency times for the correct remote operation of the weapons system is elapsed, the RF modem of the weapons system enters a degraded mode from the radio point of view and/or retries to transmit the data. In the event of failure, the RF modem signals the weapons system CAN bus that the message has not been transmitted (e.g. by sending a "second" acknowledgment). The other clients of the CAN bus then receive such information and continue the operations thereof based on said information.

In order to remedy the aforementioned difficulty, which could be seen as a fault in the system, provision will thus be made according to the invention, to send, while the radio acknowledgment is pending, a second provisional acknowledgment on the CAN bus pending the reception of the final acknowledgment. The above can be done e.g. by keeping, in the modems, an inventory which repeats the list of messages sent (as already suggested hereinabove), the messages being erased as soon as the final acknowledgments are received. Such a technique will enable the CAN buses to operate correctly while taking into account the constraints thereof, in particular by following the authorized latency times of the buses and with modems the operation of which will be transparent for the bus system.

Such method can be advantageously applied when there is an overload of transmitter messages, and/or when there is an arbitration problem during simultaneous sending of acknowledgment messages.

Figure 4:
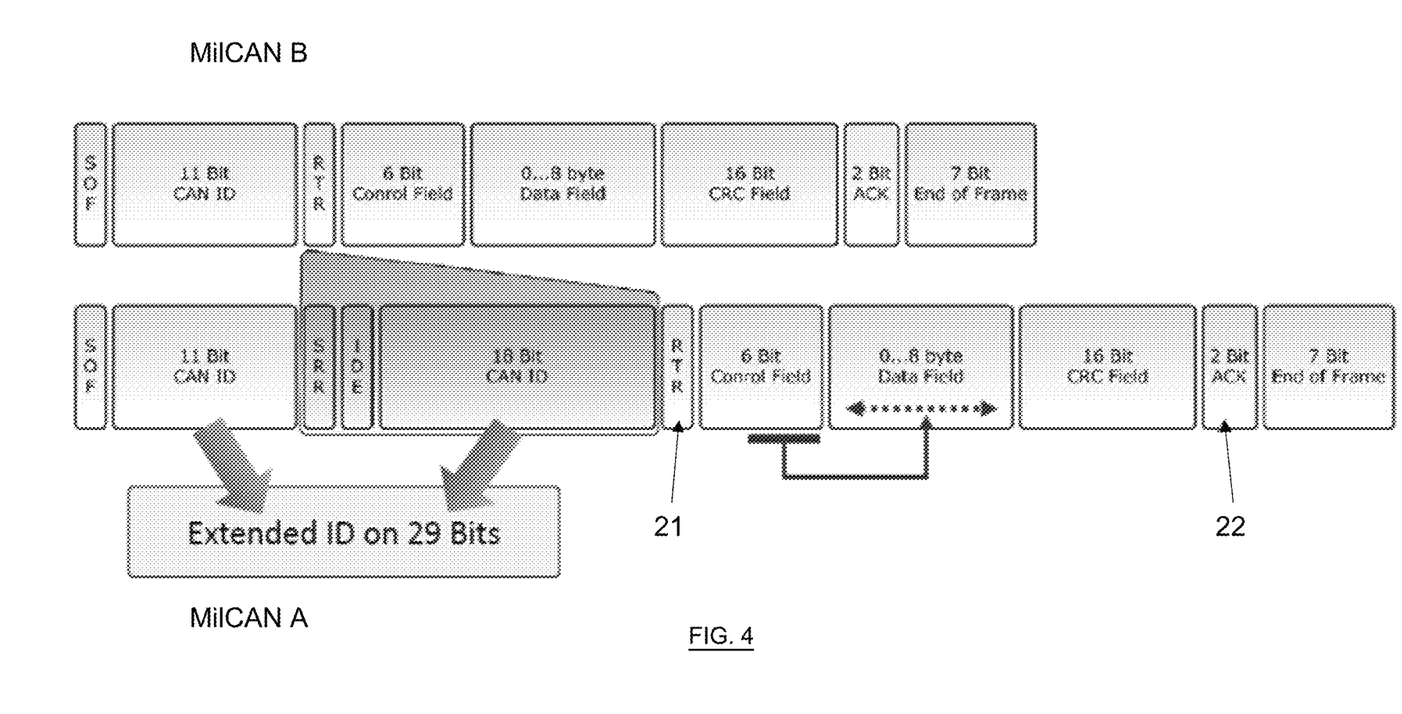
FIG. 4 shows the information processing structure using a MilCAN bus.

FIG. 4 shows the diagram of the information processing (frame) by means of a MilCAN bus.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 turret of armored vehicle or generally weapon system
2 remote control station
3 wireless link (radio)
4 acquisition interface
5 control interface
6 video streaming selection
7 sensor
8 command
9 command control
10 video streaming
11 control station modem
12 removable turret controller modem
13 control station CAN bus
14 turret CAN bus
20 additional removable controller for a remotely operated turret
21 CAN Frame—Remote Transmission Request (RTR) bit:
   0 if data, 1 if request
22 CAN frame—ACK Bits (acknowledgment)

The invention claimed is:

1. A system for securing two-way communications using a radio frequency wireless network between N weapons systems to be remotely operated, with N≥1, and a control station, the system comprising:
   a remote-control station accommodating at least one operator, with a first field data bus to which a first controller is connected with at least a first transceiver system as a client; and
   N conventional weapons systems, each with a second field data bus, and at least one client, the system comprising an additional client provided with a second transceiver system, configured to be connected to each of the N weapons systems, permanently or removably, for operation in remote operation mode, the first controller with the first transceiver thereof being configured to receive data from and/or send commands to the client via the radio frequency wireless network and the additional client with the second transceiver being configured to send data from and/or receive commands for the client via the radio frequency wireless network, wherein
the first transceiver and the second transceiver comprise software programs, defining an operation in software radio or SDR mode and are configured to exchange messages so as to provide a requested quality of service comprising a predetermined latency time, and
wherein the system is configured to enter a degraded SDR mode if the predetermined latency time is exceeded, and to allow both field data buses and respective clients thereof to be operated smoothly despite radio link interference as follows:
  a transmitter configured to send a message to a receiver receives a first acknowledgment from the receiver, which allows the message sent to the transmitter to be erased,
  based on the first acknowledgment not being received, the message is returned a certain number of times within a time limit set by the predetermined latency time,
  after the time limit, the sender enters the degraded SDR dmode and/or continues to try to pass the message and/or sends a second acknowledgment to the working bus of which the sender is a client so that other clients of the working bus are operable without disruption and in a transparent manner.

2. The system of claim 1, wherein the N weapons systems comprise armored vehicle turrets and the clients comprise sensors and actuators.

3. The system of claim 1, wherein the additional client comprises a second controller or computer equipped with the second transceiver system for removably connecting to at least one weapon system of the N weapons systems in a conventional configuration.

4. The system of claim 1, wherein the first field bus, and/or the second field bus, comprises an industrial field bus.

5. The system of claim 4, wherein the industrial field bus comprises CAN, MilCAN, or Ethernet.

6. The system of claim 1, wherein the field buses are replaceable by communication systems operating according to other architectures.

7. The system of claim 6, wherein the other architectures comprise a star network architecture.

8. The system of claim 1, wherein accessibility for the operator to respective devices, controllers, sensors, and actuator commands of the weapons system is transparent and identical to a conventional configuration where the weapons system is manned.

9. The system of claim 1, wherein the system is configured for accepting commands sent with very low latency.

10. The system of claim 1, wherein the system is configured to manage multiple communications with the weapons systems.

11. The system of claim 1, further comprising:
  means for searching for unmanned frequencies so as to avoid jamming and enemy radio links.

12. A method of operating a weapons system comprising:
  successively operating the weapons system in one of the following two modes and vice versa:
    an unmanned remote operation mode using a security system for two-way radio communications between the control station and the weapons system, according to claim 1; and
    an ordinary or conventional mode of operation, in manned form, in which the second controller or computer equipped with a second transceiver system is disconnected from the weapons system.

13. The method of claim 12, wherein the weapons system comprises an armored vehicle turret.

\* \* \* \* \*